(12) United States Patent
Kanzawa et al.

(10) Patent No.: US 6,310,167 B1
(45) Date of Patent: Oct. 30, 2001

(54) ETHYLENE HOMOPOLYMER AND ITS MOLDED ARTICLE

(75) Inventors: Mitsugu Kanzawa; Fumio Okuda; Tatsuya Housaki; Tomio Tatsumi, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/373,194

(22) Filed: Aug. 12, 1999

(30) Foreign Application Priority Data

Sep. 8, 1998 (JP) .................................. 10-253422

(51) Int. Cl.$^7$ .......................... C08F 10/02; C08F 110/02; C08F 4/70

(52) U.S. Cl. .......................... 526/352; 526/117; 526/172; 525/240; 502/155

(58) Field of Search ..................................... 526/172, 352, 526/141, 117; 502/123, 155; 525/240

(56) References Cited

U.S. PATENT DOCUMENTS 6,127,497 * 10/2000 Matsunaga et al. ............... 526/141

FOREIGN PATENT DOCUMENTS

| 0 446 013 | 9/1991 | (EP) . |
|---|---|---|
| WO 84/01156 | 3/1984 | (WO) . |
| WO 96/23010 | 8/1996 | (WO) . |
| WO 97/48735 | 12/1997 | (WO) . |
| WO 98/56832 | 12/1998 | (WO) . |

* cited by examiner

*Primary Examiner*—David W. Wu
*Assistant Examiner*—R. Harlan
(74) *Attorney, Agent, or Firm*—Oblon, Spivak, McClelland, Maier & Neustadt, P.C.

(57) ABSTRACT

Provided are an ethylene homopolymer having well-balanced properties of good heat resistance, good heat-sealability and good moldability, and its molded articles. The ethylene homopolymer is characterized in that the number of butyl branches per 100 methyl branches therein falls between 1 and 20, as measured through $^{13}$C-NMR, that its density, d (kg/m$^3$), falls between 880 and 980, and that the density, d, and its melting point, Tm (° C.) , satisfy the conditions defined by the following formulae (1) to (3):

$$Tm \geq 1.2 \times d - 982 \ (980 \geq d \geq 925) \tag{1},$$

$$Tm \geq 0.6 \times d - 430 \ (925 > d \geq 915) \tag{2},$$

$$Tm \geq 0.16 \times d - 28.4 \ (915 > d \geq 880) \tag{3}.$$

The ethylene homopolymer is molded into moldings.

21 Claims, No Drawings

ETHYLENE HOMOPOLYMER AND ITS MOLDED ARTICLE

BACKGROUND OF THE INVENTION

1. Field of the Invention

The present invention relates to an ethylene homopolymer and its molded article. More precisely, the invention relates to an ethylene homopolymer having a high melting point relative to its density, and having good low-temperature heat-sealability and moldability, and also to its molded article.

2. Description of the Related Art

As a rule, polyethylenes from ethylene through polymerization are grouped into low-density polyethylene (LDPE) to be from ethylene through high-pressure radical polymerization and high-density polyethylene (HDPE) also to be from it but through polymerization in the presence of a Ziegler-Natta catalyst, depending on the methods of producing them. Polyethylenes of those types have different characteristics, and are used for different applications depending on their characteristics.

Specifically, low-density polyethylene (LDPE) to be produced through high-pressure radical polymerization of ethylene has a combined structure of long-chain branches and short-chain branches, of which the melt tension is high and the activation energy for melt fluidity is large. Therefore, it is suitable to high-speed molding and is favorable to applications for films and blow molded containers. However, as having a low melting point relative to its density, LDPE is defective in that its heat resistance is poor. In addition, since its molecular weight distribution is broad and since it contains a low-molecular-weight, low-melting-point component (low polymer), LDPE is still defective in that its environmental stress crack resistance (ESCR) is poor and its mechanical strength including, for example, impact strength, tensile strength and tear strength is low.

On the other hand, high-density polyethylene (HDPE) to be produced through polymerization of ethylene in the presence of a Ziegler-Natta catalyst has good heat resistance and high mechanical strength, as its structure has few branches. However, since its melt tension is low and its activation energy for melt fluidity is small, HDPE is defective in that its high-speed moldability is poor. In addition, HDPE is further defective in that its heat-sealing temperature is high. In that situation, improving such LDPE and HDPE is desired.

Heretofore, nobody has obtained ethylene homopolymer having well-balanced properties of good heat resistance, high mechanical strength, good low-temperature heat-sealability and good moldability.

At present, linear low-density polyethylene (LLDPE) to be produced through copolymerization of ethylene and α-olefins in the presence of a Ziegler-Natta catalyst are used in place of ethylene homopolymer. However, since the ability of the Ziegler-Nata catalyst to catalyze the copolymerization is poor, the compositional distribution in the resulting linear low-density polyethylene (LLDPE) is broad. Therefore, LLDPE is problematic in that its molded articles such as films and others are often sticky. Another problem with it is that LLDPE shall contain a larger amount of a low-molecular-weight, low-melting-point component (low polymer) with its density being lowered, and its molded articles could not have high mechanical strength.

In addition, linear low-density polyethylene (LLDPE) is often limited in its production, as it must be produced at high temperatures or must be produced through multi-stage polymerization.

Apart from the above, blending various polyolefin resins such as HDPE, LDPE, LLDPE and others is tried for improving the properties of the resins. However, this is still defective, as requiring some additional equipment for blending them, and taking a lot of time for obtaining the intended resins having high mechanical strength and good moldability.

Given that situation, if an ethylene homopolymer having well balanced properties of good heat resistance, high mechanical strength, good low-temperature heat-sealability and good moldability could be obtained, it could solve all the problems noted above.

SUMMARY OF THE INVENTION

The present invention has been made in consideration of the problems as above, and its object is to provide an ethylene homopolymer having well-balanced properties of good heat resistance, good heat-sealability and good moldability, and also to provide molded articles of the ethylene homopolymer.

We, the present inventors have assiduously studied, and, as a result, have found that an ethylene homopolymer having a specific branched structure, a specific compositional distribution and a specific molecular weight distribution has a high melting point relative to is density, and has good low-temperature heat-sealability and good moldability. On the basis of these findings, we have completed the present invention. Specifically, the invention provides an ethylene homopolymer mentioned below, and its molded article.

1. An ethylene homopolymer, which is characterized in that the number of butyl branches per 100 methyl branches therein falls between i and 20, as measured through $^{13}$C-NMR, that its density, d (kg/m$^3$), falls between 880 and 980, and that the density, d, and its melting point, Tm (° C.) as measured through differential scanning calorimetry, satisfy the conditions defined by the following formulae (1) to (3):

$$Tm \geq 1.2 \times d - 982 (980 \geq d \geq 925) \qquad (1),$$

$$Tm \geq 0.6 \times d - 430 (925 > d \geq 915) \qquad (2),$$

$$Tm \geq 0.16 \times d - 28.4 (915 > d \geq 880) \qquad (3).$$

2. The ethylene homopolymer of 1, of which the weight-average molecular weight, $Mw_{i30}$ and $Mw_{f70}$, of the initial 30 wt. % eluate and the final 70 wt. % eluate, respectively, as fractionated in temperature rising elution fractionation and measured through gel permeation chromatography, satisfy the condition defined by the following formula (4):

$$Mw_{i30}/Mw_{f70} \geq 1.0 \qquad (4).$$

3. The ethylene homopolymer of 1 or 2, of which the weight-average molecular weight, $Mw_{60L}$ and $Mw_{60U}$, of the eluate at an elution temperature of not higher than 60° C. and that at an elution temperature of higher than 60° C., respectively, as fractionated in temperature rising elution fractionation and measured through gel permeation chromatography, satisfy the condition of the following formula (5):

$$Mw_{60L}/Mw_{60U} \geq 1.0 \qquad (5).$$

4. The ethylene homopolymer of any one of 1 to 3, of which the ratio, Mw/Mn, of the weight-average molecular weight (Mw) to the number-average molecular weight (Mn) as measured through gel permeation chromatography, and the ratio, $MI_{21.6}/MI_{2.16}$, of the melt index ($MI_{21.6}$) at a temperature of 190° C. and under a load of 21.6 kg to the melt index ($MI_{2.16}$) at a temperature of 190° C. and under a load of 2.16 kg, as measured according to the method in JIS K7210, satisfy the condition of the following formula (6):

$$MI_{21.6}/MI_{2.16} \geq 6.9 \times (Mw/Mn) + 4.5 \qquad (6)$$

5. The ethylene homopolymer of any one of 1 to 4, of which the ratio, Mw/Mn, of the weight-average molecular weight (Mw) to the number-average molecular weight (Mn), as measured through gel permeation chromatography, is at least 5.

6. The ethylene homopolymer of any one of 1 to 5, of which the melting point, Tm (°C), as measured through differential scanning calorimetry, is not higher than 132° C.

7. A molded article prepared from the ethylene homopolymer of any one of 1 to 6.

DETAILED DESCRIPTION OF THE INVENTION

The invention is described in detail hereinunder.

1. Ethylene Homopolymer

The ethylene homopolymer of the invention is characterized in that the number of butyl branches per 100 methyl branches therein falls between 1 and 20, but preferably between 1 and 15, more preferably between 1 and 10, as measured through $^{13}$C-NMR.

If the number of butyl branches per 100 methyl branches therein is smaller than 1, the ethylene homopolymer could not exhibit high melt fluidity (non-Newtonian fluidity); but if larger than 20, it could not also exhibit high melt fluidity (non-Newtonian fluidity) like that where the number of branches is smaller than 1. Therefore, the ethylene homopolymer where the number of butyl branches oversteps the defined range is unfavorable, as having poor moldability.

The number of branches as referred to herein is measured through $^{13}$C-NMR. In $^{13}$C-NMR, the chemical shift signal derived from the methylene carbons constituting the main chain of the ethylene homopolymer appears at 30.0 ppm; the chemical shift signal ($1B_1$) from the methyl branches appears at 20.04 ppm; and the chemical shift signal ($2B_4$) from the butyl branches appears at 23.36 ppm. In that, the chemical shift signal ($1B_1$) from the methyl branches which appears at 20.04 ppm overlaps with the chemical shift signal ($2B_3$) from the propyl branches which appears at 20.15 ppm, from which, therefore, the integrated value of the chemical shift signal ($1B_3$) as derived from the propyl branches and appearing at 14.59 ppm is subtracted to obtain the number of branches as referred to herein. The relation between the type of branches constituting polyethylene and the chemical shift signals (XBn, where X indicates the carbon site to be assigned by the chemical shift, and n indicates the chain length of branches) from the branches follows the stipulation stated in Macromolecules, Vol. 17, pp. 1756–1761, 1984.

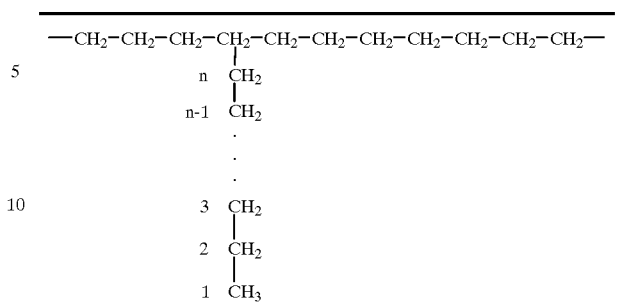

| n: | chain length of branches |
|---|---|
| n = 1: | methyl branch |
| n = 2: | ethyl branch |
| n = 3: | propyl branch |
| n = 4: | butyl branch |
| n = 5: | pentyl branch |
| n = 6: | hexyl branch |

| X: | carbon site assigned by chemical shift |
|---|---|
| X = 1: | terminal methyl carbon |
| X = 2: | α-positioned methylene carbon relative to terminal methyl carbon |
| X = 3: | β-positioned methylene carbon relative to terminal methyl carbon |
| X = 4: | δ-positioned methylene carbon relative to terminal methyl carbon |

The ethylene homopolymer of the invention has a density, d (km/m$^3$), of from 880 to 980, but preferably from 885 to 975.

If its density, d (kg/m$^3$), is smaller than 880, the ethylene homopolymer will be too flexible and, unfavorably, its mechanical strength will be poor. The ethylene homopolymer of the invention is further characterized in that its density, d (kg/m$^3$), and its melting point, Tm (°C) as measured through differential scanning calorimetry, satisfy the conditions defined by the following formulae (1) to (3):

$$Tm \geq 1.2 \times d - 982 (980 \geq d \geq 925) \qquad (1),$$

$$Tm \geq 0.6 \times d - 430 (925 > d \geq 915) \qquad (2),$$

$$Tm \geq 0.16 \times d - 28.4 (915 > d \geq 880) \qquad (3);$$

preferably, $$Tm \geq 1.2 \times d - 980 (980 \geq d \geq 925) \qquad (7),$$

$$Tm \geq 0.6 \times d - 428 (925 > d \geq 915) \qquad (8),$$

$$Tm \geq 0.16 \times d - 26.4 (915 > d \geq 880) \qquad (9);$$

more preferably, $$Tm \geq 1.2 \times d - 978 (980 \geq d \geq 925) \qquad (10),$$

$$Tm \geq 0.6 \times d - 426 (925 > d \geq 915) \qquad (11),$$

$$Tm \geq 0.16 \times d - 24.4 (915 > d \geq 880) \qquad (12).$$

If they do not satisfy the conditions of formulae (1), (2) and (3), the melting point of the ethylene homopolymer will be low, relative to the density thereof, and the heat resistance of the ethylene homopolymer will be poor. If not satisfying them, therefore, it is difficult to obtain ethylene homopolymers having good heat resistance, good low-temperature heat-sealability and good moldability.

Preferably, the ethylene homopolymer of the invention satisfies the condition defined by the following formula (4):

$$Mw_{i30}/Mw_{f70} \geq 1.0 \qquad (4)$$

wherein $Mw_{i30}$ and $Mw_{f70}$ indicate the weight-average molecular weight of the initial 30 wt. % eluate and the final 70 wt. % eluate, respectively, as fractionated in temperature rising elution fractionation and measured through gel permeation chromatography;
more preferably, $$Mw_{i30}/Mw_{f70} \geq 1.5 \qquad (13);$$

even more preferably, $$Mw_{i30}/Mw_{f70} \geq 2.0 \qquad (14);$$

still more preferably, $$Mw_{i30}/Mw_{f70} \geq 2.5 \qquad (15)$$

If not satisfying the condition of formula (4), it will be often difficult to make the ethylene homopolymer have well-balanced properties of good heat resistance, good moldability and good heat-sealability.

The initial 30 wt. % eluate of the ethylene homopolymer as fractionated in temperature rising elution fractionation, which is referred to herein, includes all the fraction of from 0 to 30% by weight as eluted in fractionation, for which the elution temperature is elevated from 10° C. to 120° C. at intervals of 5° C., and the fraction as eluted therein within a temperature range (at intervals of 5° C.) within which the 30 wt. % eluate is fractionated. The final 70 wt. % eluate also referred to herein indicates the total high-temperature eluate except the initial 30 wt. % eluate.

Also preferably, the ethylene homopolymer of the invention satisfies the condition of the following formula (5):

$$Mw_{60L}/Mw_{60U} \geq 1.0 \qquad (5)$$

wherein $Mw_{60L}$ and $Mw_{60U}$ indicate the weight-average molecular weight of the eluate (60 L) at an elution temperature of not higher than 60° C. and that of the eluate (60 U) at an elution temperature of higher than 60° C., respectively, as fractionated in temperature rising elution fractionation and measured through gel permeation chromatography;
more preferably, $$Mw_{60L}/Mw_{60U} \geq 1.5 \qquad (16),$$

even more preferably, $$Mw_{60L}/Mw_{60U} \geq 2.0 \qquad (17),$$

still more preferably, $$Mw_{60L}/Mw_{60U} \geq 2.5 \qquad (18)$$

If not satisfying the condition of formula (5), it will be often difficult to make the ethylene homopolymer have well-balanced properties of good heat resistance, good moldability and good heat-sealability.

The eluate of the ethylene homopolymer as fractionated at an elution temperature of not higher than 60° C. in temperature rising elution fractionation, which is referred to herein, is the total eluate as eluted within a temperature range of from 20° C. to 60° C. (for which the eluate from 15° C. to 20° C. is the initial eluate, and that from 55° C. to 60° C. is the final eluate). The eluate as fractionated at an elution temperature of higher than 60° C., also referred to herein, is the total eluate as eluted at temperatures higher than that temperature range.

Still preferably, the ethylene homopolymer of the invention satisfies the following formula (6):

$$MI_{21.6}/MI_{2.16} \geq 6.9 \times (Mw/Mn) + 4.5 \qquad (6),$$

wherein Mw/Mn indicates a ratio of the weight-average molecular weight (Mw) of the ethylene homopolymer to the number-average molecular weight (Mn) thereof as measured through gel permeation chromatography, and $MI_{21.6}/MI_{2.16}$ indicates a ratio of the melt index ($MI_{21.6}$) of the ethylene homopolymer at a temperature of 190° C. and under a load of 21.6 kg to the melt index ($MI_{2.16}$) thereof at a temperature of 190° C. and under a load of 2.16 kg, as measured according to the method in JIS K7210, more preferably, $$MI_{21.6}/MI_{2.16} \geq 6.9 \times (Mw/Mn) + 10 \qquad (19),$$

even more preferably, $$MI_{21.6}/MI_{2.16} \geq 6.9 \times (Mw/Mn) + 15 \qquad (20).$$

The ethylene homopolymer having a larger ratio of $MI_{21.6}/MI_{2.16}$ could have higher melt fluidity and better moldability.

Preferably, the ratio of Mw/Mn of the ethylene homopolymer of the invention is at least 5, more preferably at least 5.5, even more preferably at least 6.0. If the ratio of Mw/Mn is smaller than 5, the melt fluidity (non-Newtonian fluidity) of the ethylene homopolymer will be low, and it will be often difficult to make the ethylene homopolymer having good moldabilty.

Also preferably, the melting point, Tm (°C), of the ethylene homopolymer, as measured through differential scanning calorimetry, is not higher than 132° C.

More preferably, the melting point is not higher than 130° C., even more preferably not higher than 128° C., still more preferably not higher than 126° C.

In view of the heat resistance, it is desirable that the melting point of the ethylene homopolymer is higher. However, in consideration of the balance of the heat-sealability and the mechanical strength (e.g., impact strength) of the ethylene homopolymer, it is rather desirable that the melting point of the ethylene homopolymer is not so high but is relatively low.

2. Method for Producing Ethylene Homopolymer

For producing the ethylene homopolymer of the invention, usable are (A) a compound of a transition metal of Group 8 to Group 10 of the Periodic Table, (B) one selected from (a) aluminiumoxy compounds and (b) ionic compounds capable of reacting with the component (A) to be cations, and optionally (C) an organic aluminium compound.

As the compound (A) of a transition metal of Group 8 to Group 10 of the Periodic Table, preferred are complex compounds with a ligand of diimine compounds. They include, for example, complex compounds of a general formula (I):

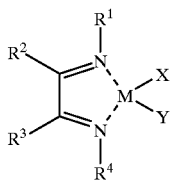

(I)

wherein $R^1$ and $R^4$ each independently represent an aliphatic hydrocarbon group having from 1 to 20 carbon atoms, or an aromatic group having from 7 to 20 carbon atoms in total and having a hydrocarbon group on the aromatic ring; $R^2$ and $R^3$ each independently represent a hydrogen atom, or a hydrocarbon group having from 1 to 20 carbon atoms, and $R^2$ and $R^3$ may be bonded to each other to form a cyclic structure; X and Y each independently represent a halogen atom, or a hydrocarbon group having from 1 to 20 carbon atoms; M represents a transition metal of Group 8 to Group 10 of the Periodic Table.

In formula (I), the aliphatic hydrocarbon group having from 1 to 20 for $R^1$ and $R^4$ includes, for example, a linear or branched alkyl group having from 1 to 20 carbon atoms, a cycloalkyl group having from 3 to 20 carbon atoms, etc. Concretely, it includes a methyl group, an ethyl group, an n-propyl group, an isopropyl group, an n-butyl group, an isobutyl group, a sec-butyl group, a tert-butyl group, a pentyl group, a hexyl group, an octyl group, a decyl group, a tetradecyl group, a hexadecyl group, an octadecyl group, a cyclopentyl group, a cyclohexyl group, a cyclooctyl group, etc. The ring of the cycloalkyl group may have some suitable substituents, thereon, such as a lower alkyl group, etc. Also for $R^1$ and $R^4$, the aromatic group having from 7 to 20 carbon atoms in total and having a hydrocarbon group on the aromatic ring includes, for example, a phenyl group, a naphthyl group and the like having, on the aromatic ring, at least one, linear, branched or cyclic $C_{1-10}$ alkyl group. For $R^1$ and $R^4$, preferred is an aromatic group having a hydrocarbon group on the aromatic ring such as that noted above, and more preferred is a 2,6-diisopropylphenyl group. $R^1$ and $R^4$ may be the same or different ones.

The hydrocarbon group having from 1 to 20 carbon atoms for $R^2$ and $R^3$ includes, for example, a linear or branched alkyl group having from 1 to 20 carbon atoms, a cycloalkyl group having from 3 to 20 carbon atoms, an aryl group having from 6 to 20 carbon atoms, an aralkyl group having from 7 to 20 carbon atoms, etc. For the linear or branched alkyl group having from 1 to 20 carbon atoms and the cycloalkyl group having from 3 to 20 carbon atoms, referred to are the same as those mentioned hereinabove for the aliphatic hydrocarbon group having from 1 to 20 carbon atoms for $R^1$ and $R^4$. The aryl group having from 6 to 20 carbon atoms includes, for example, a phenyl group, a tolyl group, a xylyl group, a naphthyl group, a methylnaphthyl group, etc. The aralkyl group having from 7 to 20 carbon atoms includes, for example, a benzyl group, a phenethyl group, etc. $R^2$ and $R^3$ may be the same or different ones, and may be bonded to each other to form a cyclic structure.

The halogen atom for X and Y includes, for example, chlorine, bromine and iodine atoms, etc. For the hydrocarbon group having from 1 to 20 carbon atoms for X and Y, referred to are the same as those mentioned hereinabove for the hydrocarbon group having from 1 to 20 carbon atoms for $R^2$ and $R^3$. For X and Y, especially preferred are a bromine atom and a methyl group. X and Y may be the same or different ones.

The transition metal of Group 8 to Group 10 of the Periodic Table for M includes, for example, nickel, palladium, platinum, iron, cobalt, rhodium, ruthenium, etc. Preferred are nickel and palladium.

Examples of complex compounds of formula (I) include compounds of the following formulae [1], [2], [3], [4], [5] and [6].

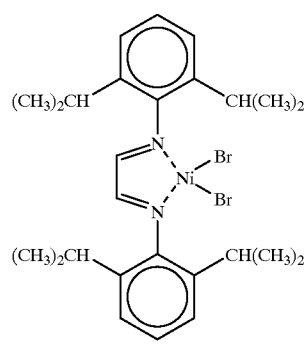

(1)

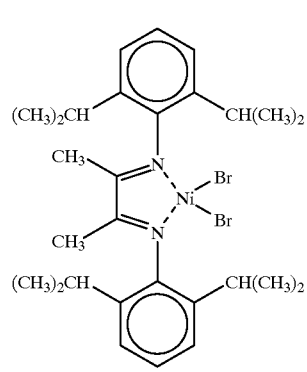

(2)

-continued (3)
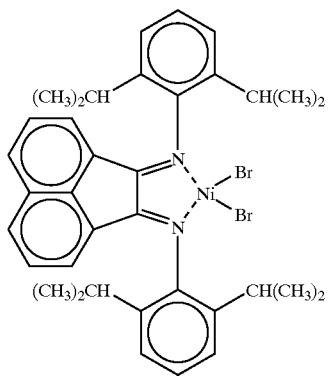

(4)
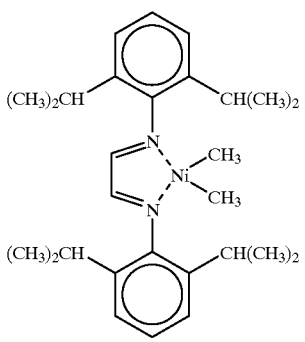

(5)
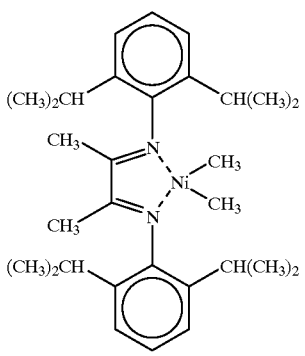

(6)
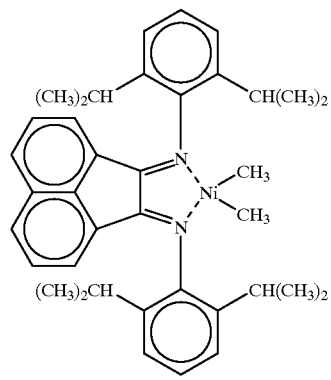

Where such complex compounds with a ligand of diimine compounds are used as the component (A) in producing the ethylene homopolymer of the invention, at least two of them are combined.

As the component (a), preferred are linear aluminoxanes of the following general formula (II), or cyclic aluminoxanes of the following general formula (III) or their associates.

(II)

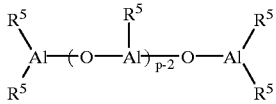

(III)

wherein $R^5$ represents an alkyl group having from 1 to 20, but preferably from 1 to 8 carbon atoms, and plural $R^5$'s may be the same or different ones; and p and r each are an integer of $2<p\leq40$ and $1<r\leq50$.

Concretely, they include methylaluminoxane, ethylaluminoxane, isobutylaluminoxane, etc.

In the invention, one or more of those aluminiumoxy compounds may be used as the component (a), either singly or as combined.

As the component (b), usable is any and every ionic compound capable of reacting with the transition metal compound (A) to be cations. Especially preferred are compounds of the following general formulae (IV) and (V), as having the ability to efficiently form polymerization active points.

 (IV)

 (V)

wherein $L^2$ represents $M^1$, $R^7R^8M^2$, $R^9{}_3C$, or $R^{10}M^2$;

$L^1$ represents a Lewis base;

$[Z]^-$ represents a non-coordinating anion $[Z^1]^-$ or $[Z^2]^-$;

$[Z^1]^-$ represents an anion of an element having plural groups bonded thereto, that may be represented by $[M^3G^1G^2 \ldots G^f]$;

$M^3$ represents an element of Group 5 to Group 15 of the Periodic Table, but preferably an element of Group 13 to Group 15 of the Periodic Table;

$G^1$ to $G^f$ each represent a hydrogen atom, a halogen atom, an alkyl group having from 1 to 20 carbon atoms, a dialkylamino group having from 2 to 40 carbon atoms, an alkoxy group having from 1 to 20 carbon atoms, an aryl group having from 6 to 20 carbon atoms, an aryloxy group having from 6 to 20 carbon atoms, an alkylaryl group having from 7 to 40 carbon atoms, an arylalkyl group having from 7 to 40 carbon atoms, a halogen-substituted hydrocarbon group having from 1 to 20 carbon atoms, an acyloxy group having from 1 to 20 carbon atoms, an organic metalloid group, or a hetero atom-containing hydrocarbon group having from 2 to 20 carbon atoms, and two or more of $G^1$ to $G^f$ may form a ring;

f represents an integer of [(valence of the center metal $M^3$) +1];

$[Z^2]^-$ represents a conjugate base of a Brönsted acid alone, of which the logarithmic reciprocal of the acid dissociation constant, pKa, is at most −10, or of a combination of the Brönsted acid and a Lewis acid, or represents a conjugate base of an ordinary ultra-strong acid, and this may be coordinated with a Lewis base;

$R^6$ represents a hydrogen atom, an alkyl group having from 1 to 20 carbon atoms, an aryl group having from 6 to 20 carbon atoms, an alkylaryl group, or an arylalkyl group;

$R^7$ and $R^8$ each represent a cyclopentadienyl group, a substituted cyclopentadienyl group, an indenyl group, or a fluorenyl group;

$R^9$ represents an alkyl group having from 1 to 20 carbon atoms, an aryl group, an alkylaryl group, or an arylalkyl group;

$R^{10}$ represents a macrocyclic ligand of, for example, tetraphenylporphin, phthalocyanine, etc.:

h represents an ionic valence of $[L^1—R^6]$ or $[L^2]$, and is an integer of from 1 to 3;

a is an integer of 1 or more, and b=(h×a);

$M^1$ represents an element of Groups 1 to 3, Groups 11 to 13 and Group 17 of the Periodic Table;

$M^2$ represents an element of Groups 7 to 12 of the Periodic Table.

Specific examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, p-nitro-N,N-dimethylaniline, etc.; phosphines such as triethylphosphine, triphenylphosphine, diphenylphosphine, etc.; thioethers such as tetrahydrothiophene, etc.; esters such as ethyl benzoate, etc.; nitriles such as acetonitrile, benzonitrile, etc.

Specific examples of $R^6$ include a hydrogen atom, a methyl group, an ethyl group, a benzyl group, a trityl group, et.; those of $R^7$ and $R^8$ include a cyclopentadienyl group, a methylcyclopentadienyl group, an ethylcyclopentadienyl group, a pentamethylcyclopentadienyl group, etc.; those of $R^9$ include a phenyl group, a p-tolyl group, a p-methoxyphenyl group, etc.; those of $R^{10}$ include tetraphenylporphin, phthalocyanine, etc.; those of $M^1$ include Li, Na, K, Ag, Cu, Br, I, etc.; and those of $M^2$ include Mn, Fe, Co, Ni, Zn, etc.

Specific examples of $M^3$ in $[Z^1]^-$, namely, $[M^3G^1G^2 \ldots G^f]$ include B, Al, Si, P, As, Sb, etc., and preferred are B and Al. For $G^1$, $G^2$ to $G^f$, the dialkylamino group includes, for example, a dimethylamino group, a diethylamino group, etc.; the alkoxy group and the aryloxy group include, for example, a methoxy group, an ethoxy group, an n-butoxy group, a phenoxy group, etc.; the hydrocarbon group includes, for example, a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, a 3,5-dimethylphenyl group, etc.; the halogen atom includes, for example, fluorine, chlorine, bromine and iodine atoms; and the hetero atom-having hydrocarbon group includes, for example, a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, a bis (trimethylsilyl)methyl group, etc.; the organic metalloid group includes, for example, a pentamethylantimonyl group, a trimethylsilyl group, a trimethylgermyl group, a diphenylarsyl group, a dicyclohexylantimonyl group, a diphenylboryl group, etc.

Specific examples of the non-coordinating anion $[Z^2]^-$, which may be a conjugate base of a Brönsted acid alone having pKa of at most −10, or of a combination of the Brönsted acid and a Lewis acid, include a trifluoromethanesulfonate anion $(CF_3SO_3)^-$, a bis(trifluoromethanesulfonyl) methyl anion, a bis(trifluoromethanesulfonyl)benzyl anion, a bis(trifluoromethanesulfonyl)amide anion, a perchlorate anion $(ClO_4)^-$, a trifluoroacetate anion $(CF_3CO_2)^-$, a hexafluoroantimonyl anion $(SbF_6)^-$, a fluorosulfonate anion $(FSO_3)^-$, a chlorosulfonate anion $(ClSO_3)^-$, a fluorosulfonate/pentafluoroantimonyl anion $(FSO_3/SbF_5)^-$, a fluorosulfonate/pentafluoroarsenyl anion $(FSO_3/AsF_5)^-$, a trifluoromethanesulfonate/pentafluoroantimonyl anion $(CF_3SO_3/SbF_5)^-$, etc.

Specific examples of the compounds for the component (b) include triethylammonium tetraphenylborate, tri-n-butylammonium tetraphenylborate, trimethylammonium tetraphenylborate, tetraethylammonium tetraphenylborate, methyl(tri-n-butyl)amamonium tetraphenylborate, benzyl (tri-n-butyl)ammionium tetraphenylborate, dimethyldiphenylammonium tetraphenylborate, triphenyl(methyl) ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl) ammonium tetrakis(pentafluorophenyl)borate, methyldiphenylammonium tetrakis(pentafluorophenyl)borate, triphenyl (methyl)ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl (2-cyanopyridinium) tetrakis(pentafluorophenyl)borate, methyl(4-cyanopyridinium) tetrakis(pentafluorophenyl) borate, triphenylphosphonium tetrakis(pentafluorophenyl) borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl) borate, (1,1'-dimethylferrocenium) tetrakis (pentafluorophenyl)borate, decamethylferrocenium tetrakis (pentafluorophenyl)borate, silver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenylporphyrin-manganese tetrakis (pentafluorophenyl)borate, silver tetrafluoroborate, silver hexafluorophosphate, silver hexafluoroarsenate, silver perchlorate, silver trifluoroacetate, silver trifluoromethanesulfonate, etc.

For the component (b), one or more of those ionic compounds capable of reacting with the transition metal compound of the component (A) to be cations may be used either singly or as combined.

The organic aluminium compound for the component (C) is not specifically defined. For example, employable are alkyl group-having aluminium compounds of the following general formula (VI), and also aluminiumoxy compounds of formulae (II) and (III) mentioned above.

$$R^{11}{}_mAl\,(OR^{12})_nX_{3-m-n} \tag{VI}$$

wherein $R^{11}$ and $R^{12}$ each represent an alkyl group having from 1 to 8, but preferably from 1 to 4 carbon atoms;

X represent, a hydrogen atom or a halogen atom;
$0 < m \leq 3$, but preferably m is 2 or 3, most preferably 3;
$0 \leq n < 3$, but preferably n is 0 or 1.

Of those alkyl group-having aluminium compounds, especially preferred are trialkylaluminium and dialkylaluminium compounds. Concretely, they include trialkylaluminiums such as trimethylaluminium, trimethylaluminium, tri-n-propylaluminium, triisopropylaluminium, tri-n-butylaluminium, triisobutylaluminium, tri-t-butylaluminium, etc.; dialkylaluminium halides such as dimethylaluminium chloride, diethylaluminium chloride, di-n-propylaluminium chloride, diisopropylaluminium chloride, di-n-butylaluminium chloride, diisobutylaluminium chloride, di-t-butylaluminium chloride, etc.; dialkylaluminium alkoxides such as dimethylaluminium methoxide, dimethylaluminium ethoxide, etc.; dialkylaluminium hydrides such as dimethylaluminium hydride, diethylaluminium hydride, diisobutylaluminium hydride, etc. In the invention, one or more such organic aluminium compounds may be used as the component (C), either singly or as combined.

The catalyst components noted above are used generally in a molar ratio of (A):(a)=from 1:1 to $1:10^6$. Preferably, the molar ratio is (A):(a)=from 1:1 to $1:10^4$. For the component (b), in general, the molar ratio is (A):(b)=from 10:1 to 1:100. Preferably, the molar ratio is (A):(b)=from 2:1 to 1:10. For the component (C), in general, the molar ratio is (A):(C)= from 1:1 to $1:2 \times 10^4$. Preferably, the molar ratio is (A):(C)= from 1:5 to $1:2 \times 10^3$. More preferably, it is (A):(C)=from 1:10 to $1:10^3$.

In the invention, at least one of the catalyst components may be carried on a suitable carrier. The type of the carrier is not specifically defined. Herein employable are any of inorganic oxide carriers, and other inorganic carriers and organic carriers. Especially preferred are inorganic oxide carriers and other inorganic carriers for easy morphology control.

Concretely, the inorganic oxide carriers include, for example, $SiO_2$, $Al_2O_3$, $MgO$, $ZrO_2$, $TiO_2$, $Fe_2O_3$, $B_2O_3$, $CaO$, $ZnO$, $BaO$, $ThO_2$, and their mixtures such as silica-alumina, zeolite, ferrite, glass fibers, etc. Of those, especially preferred are $SiO_2$ and $Al_2O_3$. The inorganic oxide carriers may contain minor carbonates, nitrates, sulfates, etc.

As other carriers except those mentioned above, also employable herein are magnesium compounds of a general formula, $MgR^{13}{}_xX^1{}_y$, such as typically $MgCl_2$ and $Mg(OC_2H_5)_2$, and their complexes. In that formula, $R^3$ represents an alkyl group having from 1 to 20 carbon atoms, an alkoxy group having from 1 to 20 carbon atoms, or an aryl group having from 6 to 20 carbon atoms, $X^1$ represents a halogen atom, or an alkyl group having from 1 to 20 carbon atoms, x is from 0 to 2, y is from 0 to 2, and x+y=2. Plural $R^{13}$'s and also $X^1$'s, if any, may be the same or different ones.

The organic carriers include, for example, polymers such as polystyrene, styrene-divinylbenzene copolymers, polyethylene, polypropylene, substituted polystyrenes, polyarylates, etc., as well as starch, carbon, etc.

As the carrier, preferably used herein are $MgCl_2$, $MgCl(OC_2H_5)$, $Mg(OC_2H_5)_2$, $SiO_2$, $Al_2O_3$, etc. Though depending on their type and the method for producing them, the carrier generally has a mean grain size of from 1 to 300 µm, preferably from 10 to 200 µm, more preferably from 20 to 100 µm.

If the grain size of the carrier used is too small, fine powder will increase in the polymer produced; but if it is too large, coarse grains will increase therein, and will lower the bulk density of the polymer produced and will clog hoppers.

The specific surface area of the carrier generally falls between 1 and 1000 $m^2/g$, preferably between 50 and 500 $m^2/g$; and the pore volume thereof generally falls between 0.1 and 5 $cm^3/g$, preferably between 0.3 and 3 $cm^3/g$.

If any of the specific surface area and the pore volume of the carrier to be used overstep the defined ranges, the catalyst activity will often lower. The specific surface area and the pore volume could be obtained, for example, from the volume of the nitrogen gas as adsorbed by the carrier, according to the BET method (see J. Amt. Chem. Soc., Vol. 60, page 309, 1983).

It is desirable that the inorganic oxide carriers mentioned above are previously baked generally at a temperature falling between 150 and 1000° C., preferably between 200 and 800° C.

The polymerization mode and the polymerization condition for the ethylene homopolymer of the invention are mentioned below. The polymerization may be effected in any manner of batchwise or continuous modes, for which is employable any desired method of slurry polymerization, vapor-phase polymerization, bulk polymerization, solution polymerization, etc.

The polymerization solvent for slurry polymerization or solution polymerization includes, for example, aliphatic hydrocarbons such as propane, butane, pentane, hexane, heptane, octane, decane, dodecane, kerosene, etc.; alicyclic hydrocarbons such as cyclopentane, cyclohexane, methylcyclohexane, etc.; aromatic hydrocarbons such as benzene, toluene, xylene, etc.; halogenohydrocarbons such as ethylene chloride, chlorobenzene, dichloromethane, chloroform, etc. These solvents may be used either singly or as combined.

Regarding the polymerization condition, the polymerization temperature generally falls between −50 and 200° C., but preferably between −20 and 150° C., more preferably between 0 and 120° C. The polymerization pressure generally falls between 0 and 200 $kg/cm^2G$, but preferably between 0.1 and 150 $kg/cm^2G$, more preferably between 0.2 and 100 $kg/cm^2G$. The polymerization time generally falls between 10 seconds and 40 hours, but preferably between 30 seconds and 30 hours, more preferably between 1 minute and 10 hours. It is desirable that the amount of the catalyst to be used falls between 1 and $10^8$, more desirably between 100 and $10^7$, in terms of the ratio of the monomer to the component (A) in the catalyst.

3. Molded Articles

The molded articles of the invention are prepared from the ethylene homopolymer noted above. The molded articles are not specifically defined, for example, including films, sheets, stationery, daily necessities, pipes, containers, tanks, etc.

For molding the ethylene homopolymer to those molded articles, for example, employable are any methods of injection molding, compression molding, injection compression molding, gas-assisted injection molding, gas-assisted injection compression molding, extrusion molding, press molding, blow molding, inflation molding, casting, etc.

The molding condition is not specifically defined, and employable herein is any condition under which ordinary polyethylene could melt. For example, the ethylene homopolymer of the invention may be molded at a temperature falling between 150° C. and 230° C.

The invention is described concretely with reference to the following Examples, which, however, are not intended to restrict the scope of the invention.

The ethylene homopolymer produced through polymerization is evaluated according to the methods mentioned below.

(1) Number of Butyl Branches per 100 Methyl Branches

Measured through $^{13}$C-NMR according to the method mentioned hereinabove. To obtain the $^{13}$C-MMR spectral pattern, used is an NMR device of JEOL's JNM-EX400 Model under the condition mentioned below.

NMR Condition

Sample concentration: 220 mg/3 ml of NMR solvent.

NMR solvent: 1,2,4-trichlorobenzene/benzene-d6=90/10 (by volume).

Temperature: 130° C.

Pulse: 45°

Pulse pitch: 4 seconds.

Integration: 4000 times.

(2) Temperature Rising Elution Fractionation (TREF)

5 g of a sample of ethylene homopolymer to be measured is completely dissolved in 200 ml of orthodichlorobenzene (hereinafter referred to as ODCB) with stirring at 135° C. The dissolved sample is introduced into a TREE column of 5 cm in diameter and 30 cm in length filled with Chromosorb PNAW (30 to 60 meshes), at a column temperature of 135° C., then kept therein for 1 hour at the same temperature, and thereafter cooled to 10° C. at a cooling rate of 5° C./hr. At the time when the column temperature has reached 10° C., one liter of ODCB is fed into the column, with which the ODCB-soluble fraction is eluted out. The ODCB-soluble eluate fraction is re-precipitated in acetone of 5 times as large as it, then filtered and dried to fractionate the ODCB-soluble fraction at 10° C. Next, the column with the sample therein is stepwise heated at intervals of 5° C. up to 115° C., and processed in the same manner as previously. The fraction as eluted at each temperature is fractionated and collected.

The device and the condition for TREF are mentioned below.

1) Device

TREF column: GL Science's silica gel column (5 cm in diameter and 30 cm in length).

Feed pump: Senshu Scientific's SSC-3100 Model pump.

TREF oven: from GL Science.

Two-series temperature controller: Rigaku Kogyo's REX-C100 Model temperature controller.

10-way valve: Valco Instrument's Electric Valve.

(3) Molecular Weight Distribution (Mw/Mn)

Measured through gel permeation chromatography (GPC), for which the condition is as follows:

Device: Waters' ALC/GPC 150C.

Column: Tosoh's TSK HM+GMH6, two series columns.

Flow rate: 1.0 ml/min.

Solvent: 1,2,4-trichlorobenzene.

Temperature: 135° C.

(4) Melting Point (Tm)

Measured through differential scanning calorimetry (DSC). Briefly, a sample of the ethylene homopolymer to be measured is formed into a pressed sheet at 190° C. The sample sheet is melted under heat at 150° C. for 5 minutes, then cooled to −50° C. at a cooling rate of 10° C./min, and thereafter heated at a heating rate of 10° C./min. In the heat cycle, the temperature at which the sample gives the highest peak for the heat of fusion is read through DSC, and it indicates the melting point of the sample.

(5) Melt Index (MI)

Measured according to the method stipulated in JIS K7210. Specifically, $MI_{2.16}$ is MI of a sample of the ethylene homopolymer as measured at 190° C. and under a load of 2.16 kg; and $MI_{21.6}$ is MI of the same sample as measured at 190° C. and under a load of 21.6 kg.

(6) $MI_{21.6}/MI_{2.16}$

This is the ratio of $MI_{21.6}$ to $MI_{2.16}$ of the sample measured as in (5).

(7) Density

A pressed sheet sample as produced at 190° C. is rapidly cooled, and its density is measured in a density-gradient tube.

(8) Heat-sealing Temperature (H.S.T., °C.)

Measured according to the method stipulated in JIS Z1707. Concretely, a film sample of the ethylene homopolymer to be tested is sealed under the condition mentioned below, using a heat-sealing bar as calibrated with a surface temperature. Then, this is left overnight at room temperature, and thereafter peeled at room temperature, at an angle of 90 degrees and at a peeling rate of 200 mm/min, according to a T-direction peeling method. In that method, the peeling strength of the sample is measured. The heat-sealing temperature is defined to be the temperature at which the peeling strength is 300 g/15 mm, and this is obtained from the sealing temperature-peeling strength curve of the sample.

Sealing Condition

Constitution for sealing: metal substrate/film/film/metal substrate.

Sealed area: 15×10 mm.

Pressure for sealing: 2.0 kg/cm$^2$.

Sealing time: 1 second.

Sealing temperature: several points from which the heat-sealing temperature could be interpolated.

EXAMPLE 1

A 1.6-liter autoclave equipped with a stirrer was heated at 80° C., fully degassed and dried. Then, this was purged with dry nitrogen to have an atmospheric pressure, and cooled to room temperature. 400 ml of deoxygenated dry toluene and 10 mmols of methylaluminoxane (in toluene) were put into the autoclave in a dry nitrogen atmosphere, stirred at 500 rpm, heated up to 40° C. over a period of 5 minutes, and further stirred or 5 minutes.

Next, 10 μmols of a transition metal compound (1) and 1 μmol of a transition metal compound (2) were put into the autoclave, and still at 40° C., ethylene was continuously fed thereinto under an ethylene gauge pressure of 8 kg/cm$^2$G, and polymerized therein for 1 hour.

After the polymerization, the catalyst was deactivated with a small amount of methanol, and the non-reacted ethylene was removed under reduced pressure. The reaction mixture was put into a small amount of methanol and washed with it, and then taken out through filtration and dried to obtain 48.5 g of polyethylene. The catalyst activity was 75.1 kg/g-Ni·hr.

The data of the polyethylene as measured according to the methods mentioned above are shown in Table 1.

The transition metal compounds (1) and (2) used herein are as follows:

transition metal compound (1)

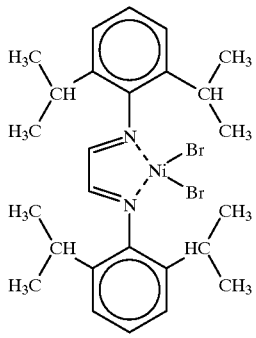

transition metal compound (2)

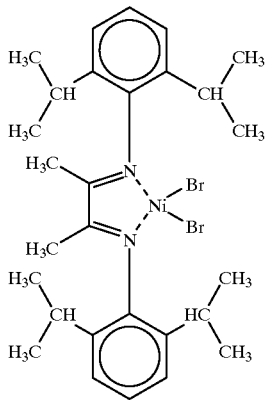

EXAMPLE 2

The same process as in Example 1 was repeated except that the polymerization temperature was changed to 50° C. and that the ethylene gauge pressure was changed to 5 kg/cm$^2$G, to obtain 27.2 g of Polyethylene. The catalyst activity was 42.0 kg/g-Ni·hr.

The data of the polyethylene as measured according to the methods mentioned above are shown in Table 1.

EXAMPLE 3

The same process as in Example 1 was repeated except that 0.5 μmols of the transition metal compound (2) was used, to obtain 38.2 g of polyethylene. The catalyst activity was 62.0 kg/g-Ni·hr.

EXAMPLE 4

The same process as in Example 1 was repeated except that a transition metal compound (3) mentioned below was used in place of the transition metal compound (2), to obtain 44.7 g of polyethylene. The catalyst activity was 69.2 kg/g-Ni·hr. The data of the polyethylene as measured according to the methods mentioned above are shown in Table 1.

transition metal compound (3)

Comparative Example 1

The same process as in Example 1 was repeated except that the transition metal compound (2) was not used, to obtain 40.3 g of polyethylene. The catalyst activity was 68.6 kg/g-Ni·hr. The data of the polyethylene as measured according to the methods mentioned above are shown in Table 1.

Comparative Example 2

The same process as in Example 2 was repeated except that the transition metal compound (2) was not used, to obtain 24.1 g of polyethylene. The catalyst activity was 41.1 kg/g-Ni·hr. The data of the polyethylene as measured according to the methods mentioned above are shown in Table 1.

Comparative Example 3

The same process as in Example 3 was repeated except that the transition metal compound (2) was not used, to obtain 34.2 g of polyethylene. The catalyst activity was 58.3 kg/g-Ni·hr. The data of the polyethylene as measured according to the methods mentioned above are shown in Table 1.

TABLE 1

|  | Example 1 | Example 2 | Example 3 | Example 4 | Comp. Example 1 | Comp. Example 2 | Comp. Example 3 |
|---|---|---|---|---|---|---|---|
| Number of butyl branches per 100 methyl branches | 8 | 7 | 12 | 8 | 9 | 11 | 7 |
| Density, d (kg/m$^3$) | 910.2 | 898.3 | 918.4 | 916.3 | 928.7 | 921.1 | 904.9 |

TABLE 1-continued

|  | Example 1 | Example 2 | Example 3 | Example 4 | Comp. Example 1 | Comp. Example 2 | Comp. Example 3 |
|---|---|---|---|---|---|---|---|
| Melting point, Tm (° C.) | 124.2 | 122.3 | 128.1 | 126.7 | 122.1 | 120.2 | 109.9 |
| 1.2 × d − 982 | — | — | — | — | 132.4 | — | — |
| 0.6 × d − 430 | — | — | 121.4 | 119.8 | — | 122.7 | — |
| 0.16 × d − 28.4 | 117.2 | 115.3 | — | — | — | — | 116.4 |
| $Mw_{i30}$ | $99.0 \times 10^4$ | $10.3 \times 10^5$ | $96.9 \times 10^4$ | $65.5 \times 10^4$ | $3.7 \times 10^4$ | $14.2 \times 10^4$ | $10.8 \times 10^4$ |
| $Mw_{i30}/Mw_{f70}$ | 2.70 | 3.31 | 2.95 | 2.07 | 0.22 | 0.63 | 0.55 |
| $Mw_{60L}$ | $12.5 \times 10^5$ | $10.9 \times 10^5$ | $16.0 \times 10^5$ | $99.9 \times 10^4$ | $4.5 \times 10^4$ | $19.3 \times 10^4$ | $10.2 \times 10^4$ |
| $Mw_{60L}/Mw_{60U}$ | 3.17 | 3.49 | 3.61 | 3.25 | 0.32 | 0.37 | 0.42 |
| Mw | $39.5 \times 10^4$ | $31.1 \times 10^4$ | $44.2 \times 10^4$ | $30.7 \times 10^4$ | $14.2 \times 10^4$ | $52.7 \times 10^4$ | $24.1 \times 10^4$ |
| Mw/Mn | 6.57 | 5.68 | 8.66 | 5.72 | 3.75 | 3.81 | 4.47 |
| $MI_{2.16}$ (g/10 min) | 0.032 | 0.041 | 0.053 | 0.06 | 0.22 | 0.64 | 1.61 |
| $MI_{21.6}$ (g/10 min) | 3.02 | 3.82 | 4.73 | 5.48 | 16.43 | 22.02 | 72.19 |
| $MI_{21.6}/MI_{2.16}$ | 94.38 | 93.17 | 89.25 | 91.33 | 74.7 | 34.41 | 44.84 |
| 6.9 × (Mw/Mn) + 4.5 | 49.83 | 43.69 | 64.25 | 44.38 | 30.38 | 30.79 | 35.34 |
| H.S.T. (° C.) | 87.2 | 74.3 | 98.4 | 94.8 | 131.3 | 122.5 | 101.6 |

As being characterized by having a specific branched structure, a specific compositional distribution and a specific molecular weight distribution, the ethylene homopolymer of the invention has a high melting point relative to its density, and has good low-temperature heat-sealability and good moldability. Therefore, it is favorable to various molded articles.

While the invention has been described in detail and with reference to specific embodiments thereof, it will he apparent to one skilled in the art that various changes and modifications can be made therein without departing from the spirit and scope thereof.

What is claimed is:

1. An ethylene homopolymer, wherein the homopolymer has a number of butyl branches per 100 methyl branches of 1 to 20 when measured by $^{13}$C-NMR, a density d of 880 to 980 kg/m$^3$, a ratio of the weight-average molecular weight to the number average molecular weight (Mw/Mn) of at least 5, and the density d and a melting point Tm as measured by differential scanning calorimetry which satisfy the following Formula 1:

$$Tm(°C.) \geq 1.2 \times d - 982 \quad (1)$$

when d is 925 to 980 kg/m3;
which satisfy the following Formula 2:

$$Tm(°C.) \geq 0.6 \times d - 430 \quad (2)$$

when d is equal to or higher than 915 and lower than 925; and
which satisfy the following Formula 3:

$$Tm(°C.) \geq 0.16 \times d - 28.4 \quad (3)$$

when d is equal to or higher than 880 and lower than 915.

2. The ethylene homopolymer of claim 1, wherein a weight-average molecular weight of the initial 30 wt % eluate ($Mw_{i30}$) and a weight-average molecular weight of the final 70 wt eluate ($Mw_{f70}$), as fractionated by temperature rising elution fractionation and measured through gel permeation chromatography, satisfy the following Formula 4:

$$Mw_{i30}/Mw_{f70} \geq 1.0 \quad (4).$$

3. The ethylene homopolymer of claim 1, wherein a weight-average molecular weight of the eluate at an elution temperature of not higher than 60° C. ($Mw_{60L}$) and a weight-average molecular weight of the eluate at an elution temperature of higher than 60° C. ($Mw_{60U}$), as fractionated by temperature rising elution fractionation and measured through gel permeation chromatography, satisfy the following Formula 5:

$$Mw_{60L}/Mw_{60U} \geq 1.0 \quad (5).$$

4. The ethylene homopolymer of claim 2, wherein a weight-average molecular weight of the eluate at an elution temperature of not higher than 60° C. ($Mw_{60L}$) and a weight-average molecular weight of the eluate at an elution temperature of higher than 60° C. ($Mw_{60U}$), as fractionated by temperature rising elution fractionation and measured through gel permeation chromatography, satisfy the following Formula 5:

$$Mw_{60L}/Mw_{60U} \geq 1.0 \quad (5).$$

5. The ethylene homopolymer of claim 3, wherein Mw/Mn as measured through gel permeation chromatography, and a ratio ($MI_{21.6}/MI_{2.16}$) of a melt index measured at 190° C. and under a load of 21.6 kg ($MI_{21.6}$) to a melt index measured at 190° C. and under a load of 2.16 kg ($MI_{2.16}$), as measured according to JIS K7210, satisfy the following Formula 6:

$$MI_{21.6}/MI_{2.16} \geq 6.9 \times (Mw/Mn) + 4.5 \quad (6).$$

6. The ethylene homopolymer of claim 4, wherein Mw/Mn as measured through gel permeation chromatography, and the ratio ($MI_{21.6}/MI_{2.16}$) of a melt index measured at 190° C. and under a load of 21.6 kg ($MI_{21.6}$) to a melt index measured at 190° C. and under a load of 2.16 kg ($MI_{2.16}$), as measured according to JIS K7210, satisfy the following Formula 6:

$$MI_{21.6}/M_{2.16} \geq 6.9 \times (MW/Mn) + 4.5 \quad (6).$$

7. The ethylene homopolymer of claim 5, wherein the melting point Tm as measured through differential scanning calorimetry is not higher than 132° C.

8. The ethylene homopolymer of claim 6, wherein the melting point Tm as measured through differential scanning calorimetry is not higher than 132° C.

9. The ethylene homopolymer of claim 5, wherein the melting point Tm as measured through differential scanning calorimetry is not higher than 126° C.

10. The ethylene homopolymer of claim 6, wherein the melting point Tm as measured through differential scanning calorimetry is not higher than 126° C.

11. A molded article comprising the ethylene homopolymer of claim 1.

12. A molded article comprising the ethylene homopolymer of claim 2.

13. The ethylene homopolymer of claim 1, wherein the number of butyl branches per 100 methyl branches is 1 to 10 when measured by $^{13}$C-NMR.

14. The ethylene homopolymer of claim 1, wherein the density d is 885 to 975 kg/m³.

15. The ethylene homopolymer of claim 1, wherein the density d and the melting point Tm as measured by differential scanning calorimetry satisfy the following Formula 10:

$$Tm(°\text{ C.}) \geq 1.2 \times d - 978 \qquad (10)$$

when d is 925 to 980 kg/m3;
satisfy the following Formula 11:

$$Tm(°\text{ C.}) \geq 0.6 \times d - 426 \qquad (11)$$

when d is equal to or higher than 915 and lower than 925; and
satisfy the following Formula 12:

$$Tm(°\text{ C.}) \geq 0.16 \times d - 24.4 \qquad (12)$$

when d is equal to or higher than 880 and lower than 915.

16. The ethylene homopolymer of claim 2, wherein $Mw_{i30}/Mw_{f70} \geq 2.5$.

17. The ethylene homopolymer of claim 3, wherein $Mw_{60L}/Mw_{60U} \geq 2.5$.

18. The ethylene homopolymer of claim 4, wherein $Mw_{60L}/Mw_{60U} \geq 2.5$.

19. The ethylene homopolymer of claim 5, wherein $MI_{21.6}/MI_{2.16} \geq 6.9 \times (Mw/Mn) + 15$.

20. The ethylene homopolymer of claim 6, wherein $MI_{21.6}/MI_{2.16} \geq 6.9 \times (Mw/Mn) + 15$.

21. The ethylene homopolymer of claim 1, wherein Mw/Mn is at least 6.0.

* * * * *